UNITED STATES PATENT OFFICE.

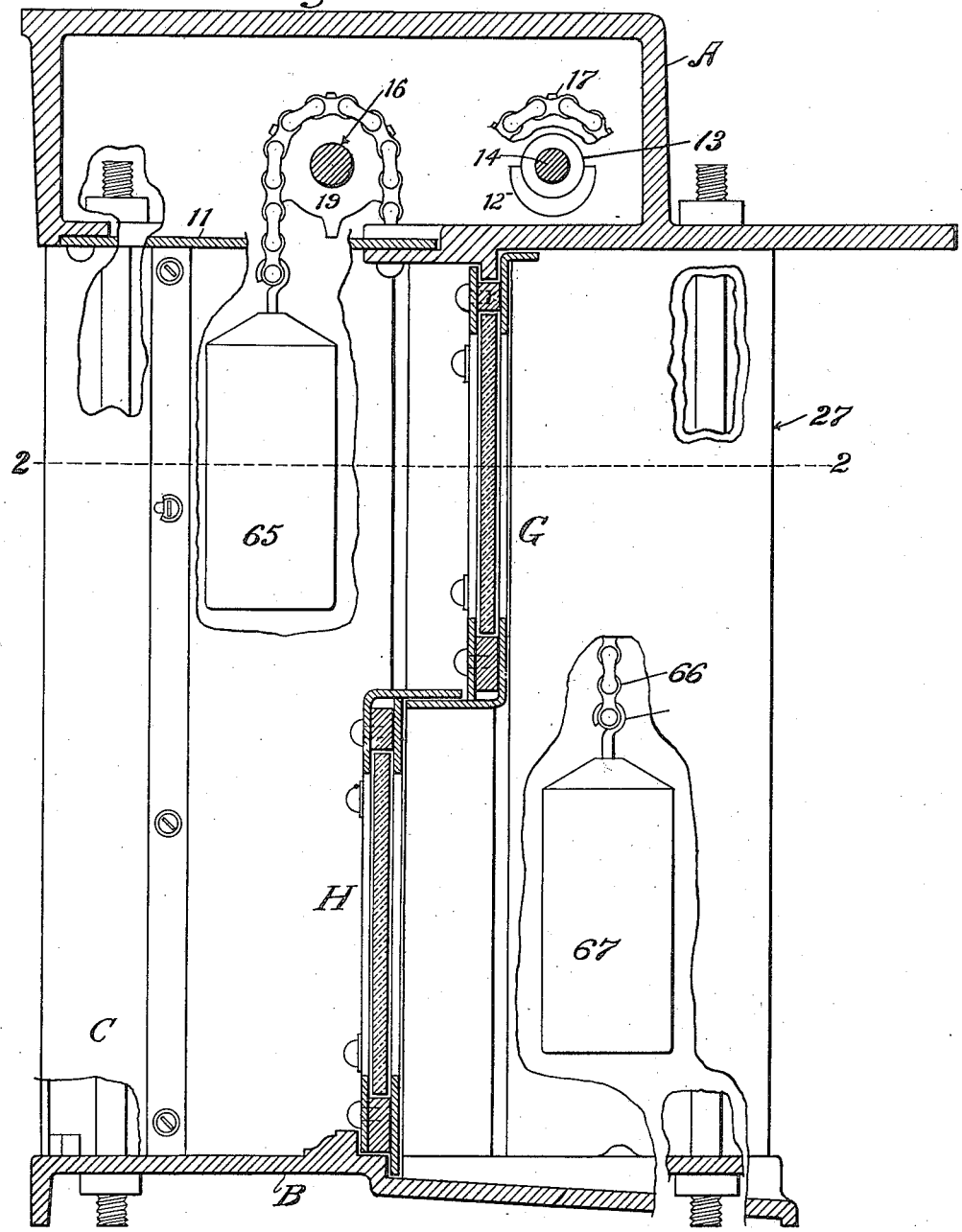

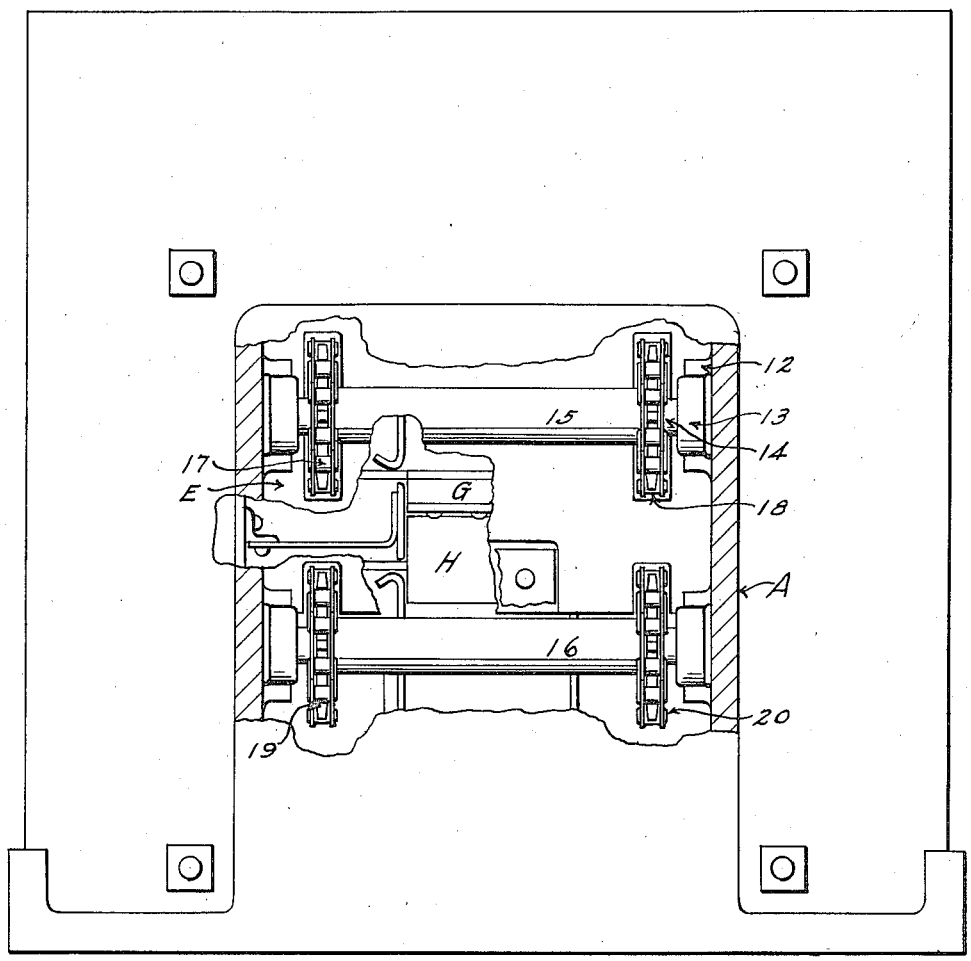

HARRY E. CAMPBELL, OF NEW YORK, N. Y.

SASH-BALANCE.

1,182,637. Specification of Letters Patent. Patented May 9, 1916.

Original application filed April 19, 1915, Serial No. 22,315. Divided and this application filed August 19, 1915. Serial No. 46,356.

*To all whom it may concern:*

Be it known that I, HARRY E. CAMPBELL, a citizen of the United States, residing at New York, in the county of New York and State of New York, have invented a certain new and useful Improvement in Sash-Balances, of which the following is a specification.

The invention relates to window-frames and sashes, and consists in the hollow lintel, or top member of the window-frame, constructed to inclose the connected suspension pulleys for the sash, whereby said pulleys are concealed and protected by said lintel.

This application is a division of my pending application Serial No. 22,315, filed April 19, 1915.

In the accompanying drawings Figure 1 is a vertical section of a window-frame and sash, showing my invention. Fig. 2 is a section on the line 2, 2 of Fig. 1.

Similar numbers and letters of reference indicate like parts.

The frame comprises a lintel A, a sill B and two hollow jambs C. The upper sash is shown at G and the lower sash at H. The lintel A is a box-shaped casting, having in its bottom an opening which is closed by the removable plate 11, Fig. 1. One edge of plate 11 is secured by a bolt in a rabbet on the under side of the lintel bottom; the other edge rests in a rabbet on the upper side of said bottom, and is similarly secured.

On the inner faces of the end walls of the lintel A are integrally formed half bearings—one of which is shown at 12—which receive the casings for the ball-bearings (one indicated at 13) for the journals 14 of the shafts 15, 16, Fig. 2. Said shafts extend across the lintel, and are removable. On shaft 15 are two sprocket pulleys 17, 18, and on shaft 16 are two sprocket pulleys 19, 20. The shafts 15, 16 with their sprocket pulleys and ball-bearings are introduced into the lintel through the opening in the bottom thereof—covering plate 11 being removed for the purpose. The sprocket chains extend down into the hollow jambs, and are connected to the sashes therein. The opposite ends of said chains carry counterweights 65, 67, which when the sashes are raised or lowered move in the hollow jambs. The sprocket pulleys and their shafts and bearings being completely inclosed within the hollow lintel are thus concealed and protected.

I claim:

1. A metal window-frame, comprising jambs, a lintel in closed box-form separate from and detachably secured to said jambs, a sash, flexible suspension means for said sash, and pulleys receiving said suspension means journaled within said lintel.

2. A metal window-frame, comprising jambs, a lintel in closed box-form separate from and detachably secured to said jambs, a sash, flexible suspension means for said sash, a shaft extending across said lintel, bearings for said shaft within said lintel, and pulleys on said shaft receiving said suspension means.

3. A metal window-frame, comprising jambs, a lintel in closed box-form separate from and detachably secured to said jambs, a sash, flexible suspension means for said sash, a shaft extending across said lintel, bearings for said shaft integrally formed with the end walls of said lintel, and pulleys on said shaft receiving said suspension means.

4. A window-frame, comprising a lintel in box-form, a sash, counter-weights therefor, flexible suspension means connected to said sash and said counter-weights, a removable shaft, half bearings within said lintel adapted to receive the journals of said shaft, pulleys on said shaft receiving said suspension means, the said lintel having in its bottom an opening for the introduction and removal of said shaft, and a cover plate for said opening having its opposite edges received respectively in rabbets formed on the upper and lower sides of said bottom plate.

5. A window-frame, comprising a lintel in box-form, journal bearings within said lintel, a removable shaft journaled in said bearings, sprocket wheels on said shaft, a sash slidable in said frame, and means engaging said wheels for suspending said sash therefrom: the said lintel having an opening in its bottom for the introduction and removal of said shaft.

In testimony whereof I have affixed my signature in presence of two witnesses.

HARRY E. CAMPBELL.

Witnesses:
GERTRUDE T. PORTER,
MAY T. MCGARRY.